(12) United States Patent
Scheja et al.

(10) Patent No.: US 10,274,306 B2
(45) Date of Patent: Apr. 30, 2019

(54) OPTICAL PROBE HAVING AN INTEGRALLY FORMED INTERFACE AND PROTECTION UNIT

(71) Applicant: HEXAGON TECHNOLOGY CENTER GMBH, Heerbrugg (CH)

(72) Inventors: Jochen Scheja, Heerbrugg (CH); Danick Brühlmann, Staad SG (CH); Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 15/382,642

(22) Filed: Dec. 17, 2016

(65) Prior Publication Data

US 2017/0176172 A1   Jun. 22, 2017

(30) Foreign Application Priority Data

Dec. 17, 2015  (EP) .................................... 15200781

(51) Int. Cl.
  *G01B 11/00* (2006.01)
  *G01B 21/04* (2006.01)
  *G02B 6/38* (2006.01)

(52) U.S. Cl.
  CPC .......... *G01B 11/007* (2013.01); *G01B 21/047* (2013.01); *G02B 6/3881* (2013.01); *G02B 6/3882* (2013.01); *G02B 6/3849* (2013.01)

(58) Field of Classification Search
  CPC .... G02B 6/3881; G01B 11/007; G01B 5/008; G01B 5/012
  USPC .......................................... 356/369, 614–626
  See application file for complete search history.

(56) References Cited

U.S. PATENT DOCUMENTS

| 5,402,582 A | 4/1995 | Raab |
| 5,483,610 A | 1/1996 | Cox |
| 5,978,748 A | 11/1999 | Raab |

(Continued)

FOREIGN PATENT DOCUMENTS

| CN | 103988049 A | 8/2014 |
| CN | 104897091 A | 9/2015 |

(Continued)

OTHER PUBLICATIONS

European Search Report dated Aug. 10, 2016 in application No. 15200781.1.

*Primary Examiner* — Isiaka O Akanbi
(74) *Attorney, Agent, or Firm* — Maschoff Brennan

(57) ABSTRACT

Some embodiments include a measuring probe adapted to be attached to a probe head of a coordinate measuring machine for determination of at least one spatial coordinate of a measurement point on an object to be measured, the measuring probe comprising an optical measuring unit adapted to provide distance measurements of measuring points at the object and a probe interface which provides modular mounting of the measuring probe to a probe head of the coordinate measuring machine and transmission, in particular bidirectional transmission, of optical signals between the probe and the coordinate measuring machine. The probe interface is designed as an integrally formed module providing a reproducible mountability of the measuring probe at the probe head and comprising a one-sided component of a ball bearing.

12 Claims, 4 Drawing Sheets

(56) References Cited

U.S. PATENT DOCUMENTS

| | | | |
|---|---|---|---|
| 6,519,860 B1 * | 2/2003 | Bieg | B23H 7/26 33/1 PT |
| 6,935,036 B2 * | 8/2005 | Raab | B23Q 35/04 33/1 N |
| 10,107,619 B2 | 10/2018 | Pettersson | |
| 2008/0024793 A1 | 1/2008 | Gladnick | |
| 2009/0187373 A1 * | 7/2009 | Atwell | B25J 9/1692 702/152 |
| 2011/0229091 A1 * | 9/2011 | Jensen | G01B 11/007 385/78 |
| 2013/0127450 A1 * | 5/2013 | Engel | B23Q 17/002 324/207.21 |
| 2014/0259715 A1 * | 9/2014 | Engel | G01B 11/007 33/503 |
| 2015/0049186 A1 | 2/2015 | Pettersson et al. | |

FOREIGN PATENT DOCUMENTS

| | | |
|---|---|---|
| DE | 43 25 337 A1 | 2/1994 |
| EP | 1 474 650 A2 | 11/2004 |
| EP | 2 356 401 B1 | 3/2016 |
| WO | 2013/091698 A1 | 6/2013 |

\* cited by examiner

OPTICAL PROBE HAVING AN INTEGRALLY FORMED INTERFACE AND PROTECTION UNIT

FIELD

The present invention generally pertains to specific design of an interface for connecting an optical measuring probe to a probe head of a coordinate measuring (CMM).

BACKGROUND

It is common practice to inspect work pieces subsequent to production on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe or probing unit) carried by the probe head. Such probing unit can be designed as a tactile probe or an optical sensor providing measurements of surfaces e.g. based on the principle of triangulation or interferometry.

In a simple form of the machine a suitable transducer or linear encoder mounted parallel to each axis is able to determine the position of the probe head relative to a base of the machine and, therefore, to determine the coordinates of measurement points on the object being illuminated by the sensor. For providing movability of the probe head a typical coordinate measuring machine may comprise a frame structure on which the probe head is arranged and driving means for moving frame components of the frame structure relative to each other.

Typical generic systems are coordinate measuring machines of the Portal type such as are described, for example, in DE 43 25 337, or 3D coordinate measuring articulated arms that, for example, are known from U.S. Pat. No. 5,402,582 or EP 1 474 650.

An advantage of using an optical sensor can be that it does not have to be in contact with the part to be measured and therefore does not deform the part during the measurement or damage it, as may be the case with a tactile probe.

However, it goes hand in hand with the optical measurement methods for coordinate measuring machines that there is a need to guide an optical signal from a sensor element to a control unit of the coordinate measuring machine, wherein typically here is used an optical fibre as optical conductor and for optical signal transmission of the measuring radiation.

Suitable optical fibres are widespread in telecommunications for signaling transmission. In order to couple said optical fibres, a multiplicity of plug-in couplings exists that are coordinated with the respective application purposes, and enable even high energy optical radiation to be transmitted via the optical fibers and the plug-in couplings in conjunction with low losses. However, the plug-in couplings have a decisive disadvantage: they have mainly been produced for static connections. Because of the high level of sensitivity of the optical interface to contamination and damage, they cannot be frequently plugged in. The forecast service life of known couplings is e.g. 500 to 1000 plug-in cycles. However, in practice they are opened only to be serviced. In addition, in order to ensure optimum transmission, the cleaning of the surfaces of the optical fibers at the optical interface is required before plugging together is undertaken anew.

In order to be able to use a coordinate measuring machine to measure complex measuring objects, for example engine blocks, there is a need to change the sensor element relatively frequently. The type of optical probe used for measuring a particular work piece has to be chosen in such a way that measuring properties of the probe fit to the shape or to topographic properties of respective parts of the work piece.

For providing individually suitable probes fitting to respective measuring requirements frequent changing of the probe attached to the probe head of the CMM is typically necessary. Moreover, a number of specified probes for respective measuring requirements are to be available for guarantee precise measurement of different work pieces.

For instance, for measuring a borehole the probe may preferably comprise a prism or mirror to emit the measuring beam in a predefined angle, e.g. 90°, relative to an extension axis of the probe stylus.

As a rough estimate, there is a need for a sensor element to be changed approximately once per hour. Since the coordinate measuring machines often are driven round the hour, 100 plug-in cycles are easily reached per week, and so the optical plug-in couplings known from telecommunications would reach the end of their expected service life as early as after approximately 3 months.

In order for it to be possible to make rational use of optical sensor elements in coordinate measuring machines, the optical couplings must fulfill at least the same requirements with regard to robustness and precision as do mechanical or mechanical/electrical coupling elements.

A coordinate measuring machine and a respective probe thus typically comprise an interface which allows to both mechanical and optical, in particular also electrical, coupling of the two components. By such interface the probe can comparatively quick and with low effort be attached to the probe head and carried and positioned by the probe head for measuring purpose. Such an optical-mechanical interface is for instance known from EP 2 356 401 B1.

According to that approach the ferrules or fibres have to be precisely aligned each time the elements are coupled to one another. The couplings comprise specific alignment units for that. Such system provides for quite tight tolerances for angular alignment which simultaneously is one of the disadvantages of that approach.

SUMMARY

Some embodiments of the present invention provide an improved probe and/or CMM design which allows fast, easy and highly reproducible adaptation of the measuring conditions to demanded measuring requirements.

The invention relates to the technical field of coordinate measuring machines. More precisely, the invention deals with the question of how to modularly, precisely, repeatable and reliable connecting a measuring probe, in particular an optical probe, with a probe head of a CMM. The general idea is an integration of relevant interface parts into one single interface component and by that to provide precise alignability of interface counterparts.

There typically is provided a two-sided interface for connecting an optical probe with a probe head. One part of the interface is assigned to the probe head, the other one to the optical probe. By coupling those parts optical and/or electrical connections are established and measuring with the optical probe controlled by the CMM is available.

Some embodiments of the invention relate to a measuring probe adapted to be attached to a probe head of a coordinate measuring machine for determination of at least one spatial coordinate of a measurement point of an object to be measured.

The measuring probe can preferably be designed as an optical probe providing distance measurement to measuring points by means of emitting and receiving a measuring laser beam. Preferably, such probe can be an optical scanning probe or a triangulation sensor.

The measuring probe comprises an optical measuring unit adapted to provide distance measurements of measuring points at the object. Such measuring unit enables measuring distances and comprises optical elements, e.g. a laser source, a lens assembly etc., for providing a measuring functionality as mentioned. Moreover, the measuring probe comprises a probe interface which provides modular mounting of the measuring probe to a probe head of the coordinate measuring machine and transmission, in particular bidirectional transmission, of optical signals between the probe and the coordinate measuring machine (when coupled to the probe head).

Furthermore, the probe interface is designed as an integrally formed module providing a reproducible mountability of the measuring probe to the probe head. The probe interface comprises a one-sided component of a ball bearing comprising at least three recesses or at least three calotte-shaped elevations. In other words, one side of the bearing is designed on side of the probe interface. The counterpart of the bearing preferably is provided by a corresponding interface part (machine interface) on side of the CMM, in particular at the probe head. The bearing is completed by coupling the interface parts.

As mentioned at least three recesses or at least three elevations are formed. The interface counterpart provides those elements which are not provided by the probe interface.

Hence, at least and preferably a 3-ball bearing is provided by coupling a probe interface with a corresponding counter interface part. A 3-ball bearing advantagely provides mounting of the interface part with high precision and in defined reproducible lateral alignment.

The probe interface also comprises a receptacle which is formed to receive a defined type of probe ferrule with known and precise position and orientation. The receptacle comprises the fixedly arranged probe ferrule according to the precise position and orientation. The receptacle is of precisely shaped dimensions thus to provide arranging the optical ferrule inside and provide precise alignment of the ferrule by its adjusted size and shape. By that, a direction of emission or reception of laser light can be provided with defined position and orientation of a respective optical axis by means of the precisely arranged ferrule.

The components of the ball bearing and the receptacle are formed from one piece (in an integrated manner). In particular a hard-metal body comprises the recesses and the receptacle as described and thus represents the probe interface according to the invention. Preferably, the recesses and the receptacle are shaped out of the hard-metal body.

For providing coupling of the modular mountable interface counterparts the measuring probe can comprise a coupling mechanism which provides modular mounting of the measuring probe to the probe head by a magnetic coupling unit adapted to provide an attractive magnetic holding force on demand, in particular wherein the magnetic coupling unit comprises an electro-magnetic element. The probe interface can be hold to the probe head by respectively applying the magnetic force.

The coupling mechanism may comprise an elastic element, in particular a spring, which—in a mounted state—provides pressing the probe interface in direction of a counter machine interface and thus provides a floating support of the interface.

According to an embodiment of the invention the measuring probe comprises a dust protection unit.

In particular, the dust protection unit is designed to be attached to the measuring probe in modular manner and can respectively be dismounted. In that context the dust protection unit can be built as a stand-alone unit for being combined with an optical measuring probe (also see description below).

The dust protection unit is designed so that the probe ferrule—in an un-mounted state—is protected by a protection element against getting in contact with dust. The protection element is—in an un-mounted state—positioned in a block-position so that a path for transmitting optical signals is blocked. Transmission of optical signals by means of the probe ferrule to and from the probe head—in a mounted state—is provided by the protection element being positioned in an open-position so that the light path is unblocked.

Some kind of moving mechanism provides displacement of the protection element depending on its respective state of mounting, i.e. provides moving of the protection element in the course of mounting or dismounting of the probe.

According to a specific embodiment of the dust protection unit that unit comprises the protection element being moveably arranged along a displacement axis, the displacement axis being transverse, in particular orthogonal, to a mounting axis which is defined by a desired direction of mounting defined by the interface. The unit also comprises a first magnetic element which is structurally connected to the protection element and a second magnetic element which is moveably arranged along an actuation axis basically parallel to or coaxial with the mounting axis. The first magnetic element and the second magnetic element are arranged relative to each other and cooperate with each other so that a lateral displacement of the protection element (along the displacement axis) depends on a position of the second magnetic element along the actuation axis.

In particular the first magnetic element is oriented so that its magnetic poles are successively arranged in a direction basically parallel to the displacement axis or basically parallel to the mounting axis.

In particular, accordingly the second magnetic element is oriented so that its magnetic poles are successively arranged in a direction basically parallel to the mounting axis or basically parallel to the displacement axis.

The second magnetic element can be mechanically decoupled from the first magnetic element.

Concerning relative arrangement of the magnetic elements—according to an embodiment of the invention—the second magnetic element is arranged so that in the un-mounted state an attractive force results from the relative arrangement of the magnetic poles of the first and the second magnetic element and the protection element is hold in the block-position. In the mounted state, a repulsive force results from the relative arrangement of the magnetic poles of the first and the second magnetic element and the protection element is hold in an unblock-position.

Preferably, the first magnetic element is oriented so that its magnetic poles are successively arranged in a direction basically parallel to the displacement axis and the second magnetic element is oriented so that its magnetic poles are successively arranged in a direction basically parallel to the mounting axis. Of course, alternative alignments and arrangements of the magnetic elements are possible as long as respective displacement of the protection element is provided.

In particular, the second magnetic element is arranged so that when setting the measuring probe from the un-mounted state into the mounted state that magnetic pole of the second magnetic element which is closest to the first magnetic element switches. By that, the property of the caused magnetic force changes, e.g. from attractive to repellent.

The displacement of the protection unit depends on the relative arrangement of the first and the second magnetic element. In a first relative position, e.g. according to the un-mounted state of the probe, an attractive magnetic force may be generated due to their relative positions and orientations of magnetic poles and the protection element is hold or moved in said block-position for protection the optical ferrule.

Alternatively, in such first relative position the magnetic force between the two magnetic elements may be negligible and the protection element may be hold in the block-position by means of a spring which is coupled to the protection element.

In a second relative position, e.g. according to the mounted state of the probe, a repulsive magnetic force may be generated due to the relative positions and orientations of magnetic poles and the protection element is hold or moved in said open-position for providing light transmission by means of the ferrule.

The magnetic elements can be designed so that the resulting magnetic force in the second position is greater than a repellent force provided by a spring and thus the protection element is moved against the spring force.

According to further embodiment of the invention, the protection unit comprises a restoring device (e.g. spring) coupled with the second magnetic element and providing a restoring force in mounting direction. By that, the second magnetic element can be provided in a defined position as long as the probe is not mounted to a probe head. When mounting the probe to the head, the second magnetic element is moved out of the defined position and a displacement of the protection element is caused.

According to an embodiment of the dust protection unit, the protection element is moveably arranged along the displacement axis, the displacement axis being transverse, in particular orthogonal, to the mounting axis which is defined by the mounting direction defined by the interface, and the dust protection unit comprises a sliding mechanism which is designed so and arranged with the protection element so that in the course of a mounting or un-mounting process the sliding mechanism is actuated and affects the protection element to be moved along the displacement axis.

Such sliding mechanism may comprise structurally joint elements, which are moveable relative to each other. A first end of the mechanism may be connected to the protection unit in order to provide respective displacement and a second end may be connected to an element which is moveably arranged along the mounting axis. By moving that element, e.g. in the course of mounting the probe, a respective movement of the protection element can be provided.

In particular, the protection unit comprises a restoring device coupled with the protection element and providing a restoring force along the displacement axis in direction to the probe ferrule to be protected.

Preferably, at least one of the restoring devices is embodied as a return spring.

Regarding the design of the interface, in one embodiment the probe ferrule is fixed inside of the receptacle by means of an adhesive, in particular glue. The receptacle may be formed with an inner diameter greater than a diameter of the ferrule in order to enable application of glue between the ferrule and the receptacle.

The integrally formed module can be made of metal, in particular of hard metal, in particular of tungsten carbide or hardened steel.

The invention also relates to the counterpart of the probe and the probe interface, i.e. the CMM (probe head) and a corresponding machine interface.

Therefore, the invention also relates to a coordinate measuring machine for determination of at least one spatial coordinate of a measurement point of an object to be measured, the coordinate measuring machine comprising a machine structure with a plurality of structural components, the structural components comprising at least a base and a probe head for approaching the measurement point, wherein the machine structure provides linking the probe head to the base. The probe head comprises a machine interface which provides modular mounting of a measuring probe to the probe head.

The machine interface is designed as an integrally formed module providing a reproducible mountability of the measuring probe at the probe head and comprises a one-sided component of a ball bearing comprising at least three recesses or at least three calotte-shaped elevations and a receptacle. The receptacle is formed to receive a defined type of machine ferrule with known and precise position and orientation, and has fixedly arranged such machine ferrule according to the precise position and orientation. The component of a ball bearing and the receptacle are formed as one piece.

The machine interface is designed so that a probe interface matches with the machine interface in order to provide coupling the probe in desired and reproducible manner.

In particular, the machine ferrule is fixed inside of the receptacle by means of an adhesive, in particular glue.

Moreover, the machine interface can be embodied as an integrally formed module made of metal, in particular of hard metal, in particular of hardened steel.

Concerning the way of coupling of the interface parts (machine and probe) according to an embodiment of the invention, the machine interface comprises a magnetic coupling unit adapted to provide a magnetic holding force on demand, in particular wherein the magnetic coupling unit comprises an electro-magnetic element. In particular, a counter probe interface part also provides respective magnetic elements for establishing the holding force.

As described above, the idea relates to coupling of two sides of an interface. Thus the invention also relates to a system of a coordinate measuring machine (with a machine interface) as described and of a measuring probe (with a probe interface) as described.

The measuring probe of the system is coupled to the probe head by means of the interfaces of the components (probe head and measuring probe), wherein the probe interface and the machine interface are designed so and arranged relative to each other so that the probe ferrule and the machine ferrule are precisely positioned and oriented relative to each other in non-contact manner, wherein a defined gap is provided between the ferrules. A precise ball bearing is provided by interaction of the respective one-sided ball bearing components cooperating with each other.

In particular, the probe ferrule and the machine ferrule are coaxially aligned and the gap is of a width of 200 μm at the maximum, in particular of 100 μm or 50 μm at the maximum.

As already mentioned above, the protection unit does not have to but can be provided as a stand-alone and preferably modular mountable (to an optical probe or its interface) component.

Therefore, a further aspect of the invention relates to a protection unit for an optical probe ferrule of an optical measuring probe of a coordinate measuring machine. The probe ferrule is adapted and arranged to bi-directionally transmit optical signals from and to the measuring probe.

The protection unit provides for dust-protection of the optical probe ferrule of the measuring probe in an un-mounted state of the measuring probe. The protection unit is designed so that the probe ferrule—in the un-mounted state—is protected against contamination, in particular by dust, by a protection element being positioned in a block-position so that the ferrule is at least partly covered and a path for transmitting the optical signals is at least partly blocked and so that transmission of the optical signals by means of the probe ferrule—in a mounted state—is provided by the protection element being brought in an open-position so that the path is unblocked. The protection unit is designed so that it is modularly attachable (mountable/dismountable) to the measuring probe of the coordinate measuring machine. The protection unit comprises a displacement mechanism which provides automatic displacement of the protection element from the block-position into the open-position in the course of mounting of the optical probe (to said probe head).

According to an embodiment of the invention, the dust protection unit comprises the protection element which is moveably arranged along a displacement axis, the displacement axis being transverse, in particular orthogonal, to a mounting axis which is defined by a mounting direction for the optical probe. The unit comprises a first magnetic element which is structurally connected to the protection element, a second magnetic element which is moveably arranged along an actuation axis basically parallel to or coaxial with the mounting axis. The first magnetic element and the second magnetic element are arranged relative to each other and cooperate with each other so that a lateral displacement of the protection element depends on a position of the second magnetic element along the actuation axis.

In particular the first and/or second magnetic element is oriented so that its magnetic poles are successively arranged in a direction basically parallel to the displacement axis or basically parallel to the mounting axis.

The second magnetic element is preferably mechanically decoupled from the first magnetic element.

In a further embodiment, the second magnetic element is arranged so that—in the un-mounted state—an attractive force results from the relative arrangement of the magnetic poles of the first and the second magnetic element and the protection element is hold in the block-position and/or—in the mounted state—a repulsive force results from the relative arrangement of the magnetic poles of the first and the second magnetic element and the protection element is hold in an unblock-position.

In particular, the second magnetic element is arranged so that when setting the measuring probe from the un-mounted state into the mounted state the magnetic pole of the second magnetic element being closest to the first magnetic element switches.

According to a further embodiment of the invention, the protection element is moveably arranged along the displacement axis, the displacement axis being transverse, in particular orthogonal, to the mounting axis which is defined by the mounting direction defined by the interface, and the dust protection unit comprises a sliding mechanism which is designed so and arranged with the protection element so that in the course of a mounting or un-mounting process the sliding mechanism is actuated and affects the protection element to be moved along the displacement axis.

The protection unit may comprise a first restoring device coupled with the second magnetic element and providing a first restoring force in direction of the actuation axis, in particular wherein the protection unit comprises a second restoring device coupled with the protection element and providing a second restoring force along the displacement axis in direction to the block-position and/or at least one of the restoring devices is embodied as a return spring. Of course, the second restoring element can be provided independent from the first restoring element.

It is to be understood, that specific embodiments of the protection unit provided and described with the measuring probe above also are applicable with the stand-alone protection unit and vice versa.

BRIEF DESCRIPTION OF THE FIGURES

The devices according to the invention are described or explained in more detail below, purely by way of example, with reference to working examples shown schematically in the drawings. Specifically.

DETAILED DESCRIPTION

Figure 1:
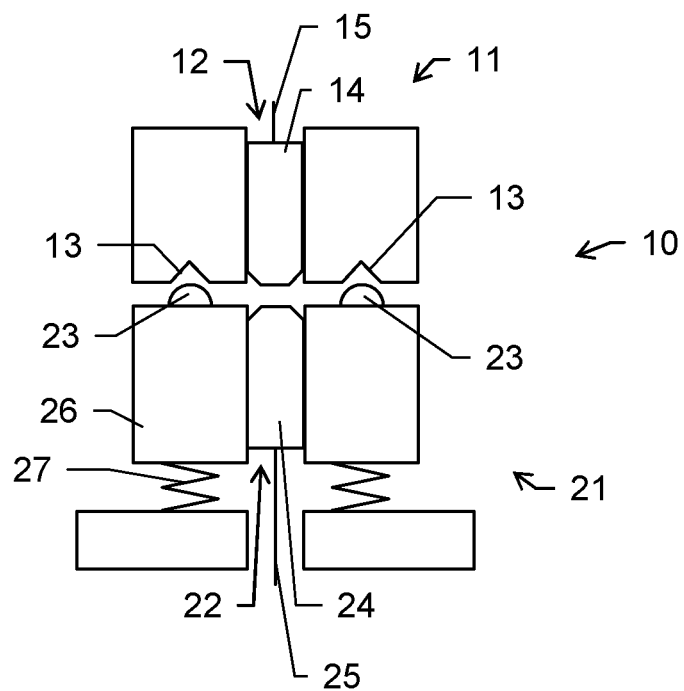
FIG. 1 shows an integrally formed interface for a coordinate measuring machine according to the invention.

FIG. 1 shows a two-part interface 10 designed to repetitively and precisely connect a measuring probe to a probe head of a coordinate measuring machine according to the invention. The interface 10 is shown in a cross-cut perspective. The interface 10 comprises a machine interface part 11 and a probe interface part 21.

The machine interface part 11 is made of hard-metal and circularly formed. A receptacle 12 is provided in the centre of the machine interface 11 for attaching an optical fibre or ferrule inside. Furthermore, the machine interface 11 comprises at least three recesses 13 (two of which are shown)

representing one side of a three-point bearing, in particular of a 3-ball-bearing. The whole module as described is integrally formed (i.e. from one piece) with very high precision. Such construction allows designing a part with very high positional precision in order to further provide high precise reproducibility with respect to an interface-connected state.

A ferrule 14 (into which an optical fibre 15 ends) is fixedly arranged within the recess 12. Recess 12 and ferrule 14 are shaped and formed in corresponding manner, i.e. an inner diameter and/or shape of the recess 12 basically corresponds to an outer diameter and/or shape of the ferrule 14. In particular, the ferrule 14 is glued in the recess 12. For example grooves along the recess allow the glue to creep in-between the ferrule and recess to achieve a tight fixation at low lateral tolerances.

The manufacturing tolerances for the hard-metal interface 11 are comparatively low for providing corresponding high precision when coupling the two interface parts on the one side and on the other side to also provide highly precise insertion of the ferrule 14 in the machine interface 11.

The probe interface part 21 is designed to match with the machine interface 11, i.e. dimensions and shapes in particular of the counterparts for the three-point bearings and/or for light transmission are provided to fit to respective parts of the machine interface 11.

According to the present embodiment the probe interface 21 is also made from one piece, i.e. integrally formed.

The integral body 26 of the probe interface 21 comprises a recess 22 within which a ferrule 24 is attached for transmission of light provided or received by the optical probe fibre 25. In addition, the probe interface 21 comprises at least three counterparts 23 for the recesses 13 of the machine interface 11. Those counterparts are embodied as half-sphere shaped elevations 23 which provide a (at least) three-point bearing when the probe interface 21 is attached to the probe head and the interface parts 11,21 are coupled to each other so that the elevations 23 cooperate with the recesses 13.

Due to the provided three-point bearing relative positioning of the probe interface 21 and the machine interface 11 is provided in high precise and restorable/repeatable manner.

The interface 10 is designed so that there exists a (air) gap between the ferrules 14 and 24 in a coupled state and thus prevents from contacting each other and consequently from damages caused by such physical contact. The distance between the end surfaces of the ferrules 14,24 (=air gap) is preferably provided with 100 µm.

As can be seen the probe side of the interface 10 may comprise a coupling mechanism which provides attachment of the probe to the probe head. Such mechanism can comprise a spring-like arrangement 27, wherein the spring guarantees a defined amount of pressing force which provides a stable connection of the interface parts 11 and 21 in the connected state. The probe interface 21 is pressed to the machine interface 11 by the spring arrangement 27.

Figure 2:
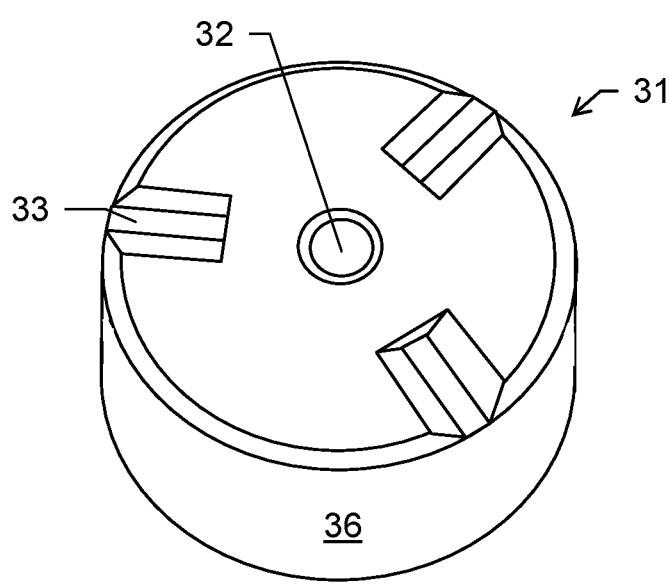
FIG. 2 shows a probe interface according to the invention in a top-side view.

FIG. 2 shows a probe interface 31 according to the invention in a top-side view. The interface body 36 is provided as a single hard-metal block (e.g. hardened steel) comprising three recesses 33 and one receptacle 32.

The receptacle 32 is designed to receive a fibre ferrule for providing transmission of measuring laser light via the ferrule. Transmission of such light can be realised in very precise manner as to very accurate forming of the receptacle 32 and the recesses 33. The three recesses 33 provide stable and repeatable mounting of the interface 31 with respect to a counterpart of the interface (not shown). A three-point bearing is provided in a mounted state of the probe interface 31, i.e. when being connected to the interface counterpart of a probe head.

Because of the integral design (one piece) of the interface body 36 which comprises both the receptacle 32 and the recesses 33 structural stability with view to their relative positions and orientations is given. Deformations or displacements thus can be avoided or at least be reduced to a minimum. Using a comparatively stiff material like hardened steel further improves the behaviour (in particular structural stability) of the interface.

The three-point bearing, e.g. 3-ball bearing, provides self alignment of two corresponding interface parts which leads to respective precise alignment of two opposing ferrules which are respectively arranged with the two interface parts. Such design enables very precise coupling for optical transmission via the ferrules.

It is to be understood in context of the present invention that a machine interface at a probe head of a CMM may be designed according to the probe interface 31 as shown and a corresponding probe interface then would structurally be adapted to match with the interface.

Figure 3A:
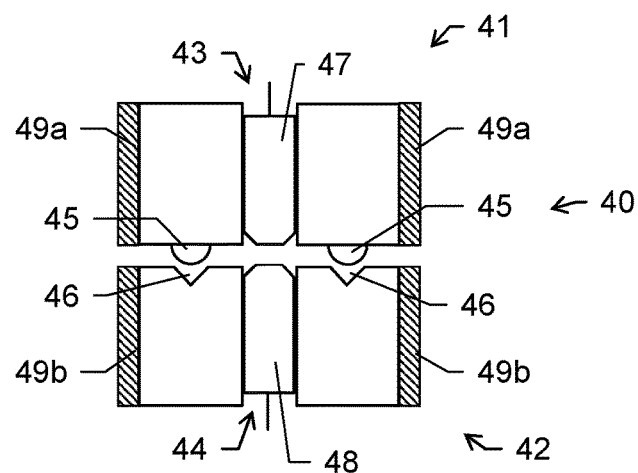
FIG. 3a shows an embodiment of an optical and mechanical interface for providing defined and precise relative positions of the interface components according to the invention, one of which being assigned to a probe head and the other to a optical measuring probe of a CMM.

FIG. 3a shows an embodiment according to the invention of an optical and mechanical interface 40 for providing defined and precise relative positions of the interface components 41,42, one of which being assigned to a probe head and the other to an optical measuring probe of a CMM.

The interface components 41 and 42 are both embodied in an integral way, i.e. precision relevant elements are formed from one single piece.

Both interface parts 41 and 42 each comprise a receptacle 43 and 44 and respective contacting elements 45 and 46 which—in a coupled state—provide precise alignment of the parts 41 and 42 relative to each other, in particular by building a three-point bearing in the coupled state.

The ferrules 47 and 48 are arranged, e.g. glued, inside of respective receptacles 43,44 and provide light transmission due to precise alignability of the contacting elements 45,46. As a consequence, the ferrules 47,48 are correspondingly precisely aligned relative to each other.

In the coupled state, the optical axes defined by the ferrules 47,48 are preferably coaxially aligned to each other. Hence, light transmission via the ferrules 47,48 can be provided in a most suitable manner, i.e. avoiding or reducing losses of light intensity. Such improved and more reliable light transmission is a result of the solid structure of the components 41,42 which provide precise and long-stable arrangement of the interface elements (ferrules 47,48 and bearing elements 45,46) and high precision concerning relative alignment of the interface elements of the opposing components 41,42.

In addition, the interface components 41,42 comprise respective and co-working coupling elements 49a and 49b. Those elements 49a,b are embodied as magnetic elements, more precisely as switchable electro-magnets. When having switched on the magnets 49a,b a magnetic attractive force is provided between the components 41,42 and the lower part 42 (which e.g. is part of an optical probe) is hold to the upper part 41 (which e.g. is part of the probe head of a CMM) by the force. By switching off the magnets the force is switched off accordingly and the components 41,42 can be separated.

Figures 3B, 3C:
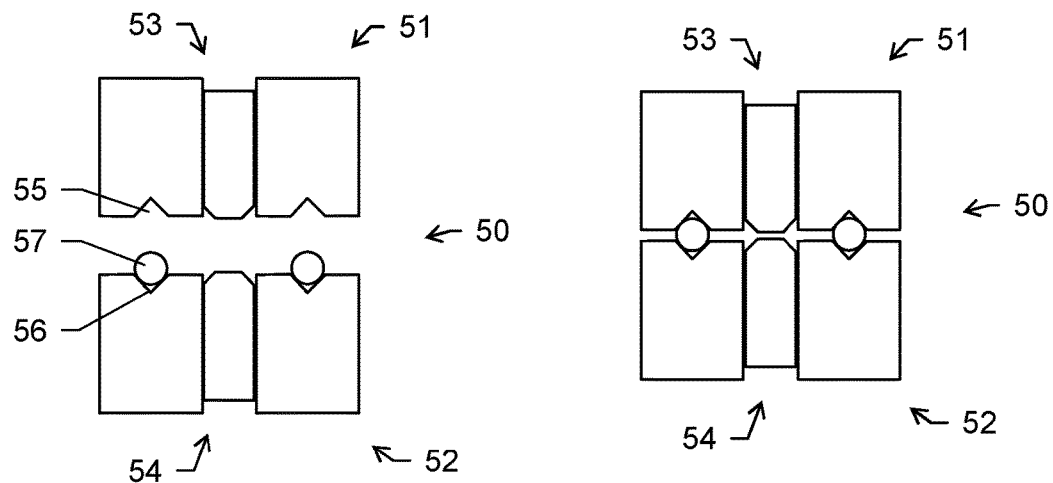
FIGS. 3b-c show a further embodiment of an optical and mechanical interface according to the invention

FIG. 3b shows a further embodiment according to the invention of an optical and mechanical interface 50 for providing defined and precise relative positions of the interface components 51,52, one of which being assigned to a probe head and the other to an optical measuring probe of a CMM.

The two sides of the interface, i.e. the components 51 and 52, are designed in an integrated manner. Each component comprises a receptacle 53,54 for receiving an optical fibre or fibre ferrule in order to provide precise transmission of measuring laser light. Furthermore, each component 51,52 comprises recesses 55,56, in particular three for providing a three-point bearing, which in combination with respective balls 57 provide ball bearings in a closed state, i.e. in a coupled state, of the interface 50.

The recesses 55,56, the balls 57 and the optical fibres or ferrules are arranged in such a way that the ferrules/fibres do not have any contact to each other in the coupled state. Such coupled state can be seen in FIG. 3c. By avoiding physical contact of the ferrules the possibility of causing damages at the ferrules, in particular with coupling or decoupling of the interface, is significantly reduced. As a consequence, measurements with an optical probe equipped with such interface are more reliable due to more stable signal transmission.

A gap between the ferrules or between fibre ends here (in the coupled state) in particular remains of at least 50 µm or of at max 200 µm.

Figure 4A:
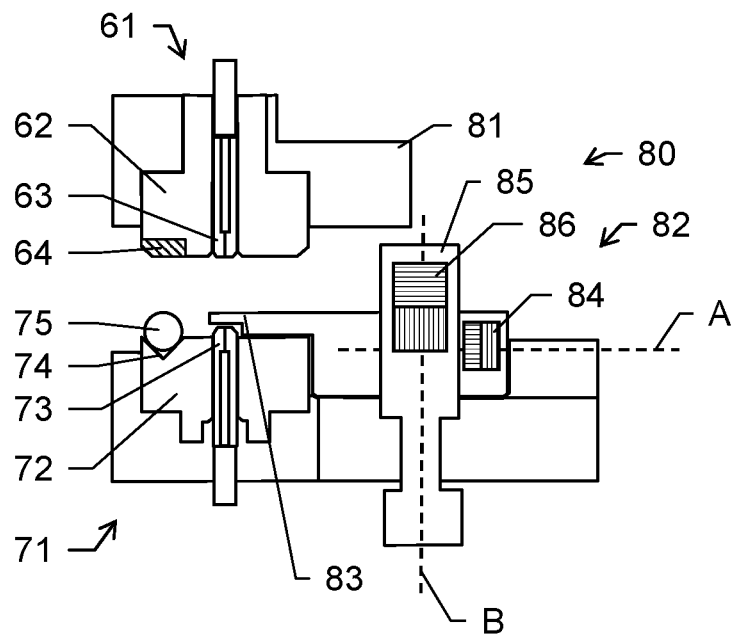
FIG. 4a-b show an interface part of a probe head of a coordinate measuring machine and an interface counterpart of an optical probe designed to be mounted at the probe head.

FIG. 4a shows an interface part 61 of a probe head of a coordinate measuring machine and an interface counterpart 71 of an optical probe designed to be mounted at the probe head.

The probe head interface 61 is embodied as one piece 62 made from hard-metal and comprising a receptacle with a ferrule 63 received inside. Furthermore, recesses 64 (in particular three, one of which is shown) are formed and provided by respective shapes of the integrated interface body 62.

The probe interface 71 comprises a receptacle with a ferrule 73 received inside and respective recesses 74 (in particular three, one of which is shown). Respective balls 75 as elements of e.g. a 3-ball bearing, which is provided in a coupled state (see FIG. 4b), are located at the recesses 74. The probe interface is also designed in an integrated manner, i.e. the interface body 72 which contains the recesses 74 and the receptacle is made from one single part.

Due to the structural, integrated design of the interfaces 61 precise coupling and signal transmission as described above is provided.

In addition, a dust protection system 80 is attached to the interface parts 61,71. The upper part 61 comprises a catching element 81 (pusher dog) by which a protective function of the protection unit 82 at the probe interface 71 can be initiated.

In particular, the dust protection system 80 is designed in a modular manner, i.e. the catching element 81 and the protection unit 82 can modularly be mounted and dismounted to/from the interfaces. According to an alternative embodiment the catching element 81 is represented by a structural part of the probe head of the CMM.

The protection unit 82 at the probe interface 71 comprises a protection element 83 which in an un-mounted state of the optical probe (as shown with FIG. 4a) provides covering of the ferrule 73. By that, possible contaminations or pollutions of the light transmitting end of the ferrule 73 can be avoided. A big advantage of such protection in the uncoupled state is that mentioned contaminations can be prevented during keeping an optical probe available for measuring, e.g. in a respective probe-exchanging unit.

The protection element 83 is moveably arranged along a displacement axis A. The displacement axis A is orthogonal to a direction of coupling the optical probe to the probe head. The protection element 83 preferably is arranged to or embodied as a carriage which can be moved at least basically parallel to the displacement axis A.

Furthermore, a first magnetic element 84 (e.g. a permanent magnet) is connected to the protection element 83. The magnetic poles of the first magnetic element 84 are successively arranged in a direction basically parallel to the displacement axis A.

The protection unit 82 further comprises a moveable switching element 85 with a second magnetic element 86. The switching element 85 is arranged movable along an actuation axis B which is basically orthogonal to the displacement axis A.

As can be seen the switching element 85 and the carriage are arranged relative to each other so that magnetic forces of the first 84 and the second 86 magnetic elements interact with each other.

As an example, the upper part of the second magnetic element 86 represents the south magnetic pole and the lower part the north magnetic pole. Correspondingly, the left part of the first magnetic element 84 represents its south magnetic pole and the right part its north magnetic pole.

As a consequence of such construction, in an uncoupled state as shown in FIG. 4a, the first magnetic element 86 is attracted by the second magnetic element 84 which leads to a covering of the ferrule 73 by the protection element 83.

Figure 4B:
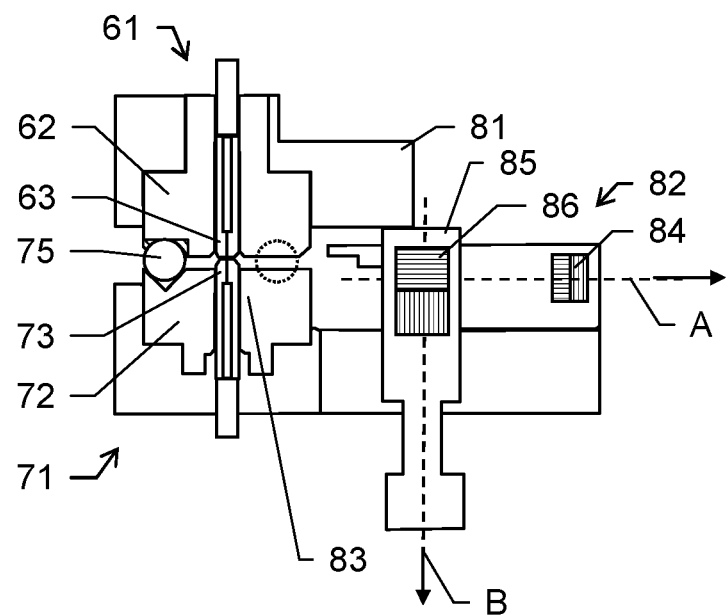

In comparison, in a coupled state as shown in FIG. 4b the switching element 85 is moved downwards along the actuation axis B which leads to an opposing arrangement of equal magnetic poles of the two magnetic elements 84 and 86, e.g. as shown the south magnetic poles are arranged closest to each other. Due to the induced movement of the second magnetic element 86 when coupling the interfaces—the movement is provided by pressing the catching element 81 on the switching element 85—the attractive magnetic force changes into a repellent magnetic force which effects movement of the protection element 83 into an unblocking position. The ferrule is no longer covered by the protection element 83 and light transmission is provided.

According to a preferred embodiment of the invention, a spring or any other kind of restoring element is connected with the switching element 85 and affects the switching element 85 to be moved in the upper position as shown with FIG. 4a in the uncoupled state.

Alternatively, the switching element 85 is connected to the catching element 81, e.g. by a specific connecting device e.g. comprising further magnetic elements, and thus is moved according to a vertical movement of the catching element 81.

According to another embodiment of the protection unit 80 (not shown), the displacement of the protection element 83 is hold in covering position due to a restoring force applied in a direction along the displacement axis. The protection is released by a repellent force induced by opposing identical magnetic poles by respective movement of the switching element along the actuation axis. The magnetic element of the switching unit may be arranged with its magnetic poles successively provided in a direction basically parallel to the displacement axis.

According to a specific embodiment of the invention, the protection element 83 may comprise a cleaning surface at its distal end (facing the ferrule 73). Such cleaning surface provides cleaning of the ferrule 73 with each covering/uncovering process of the ferrule 73.

Figure 5:
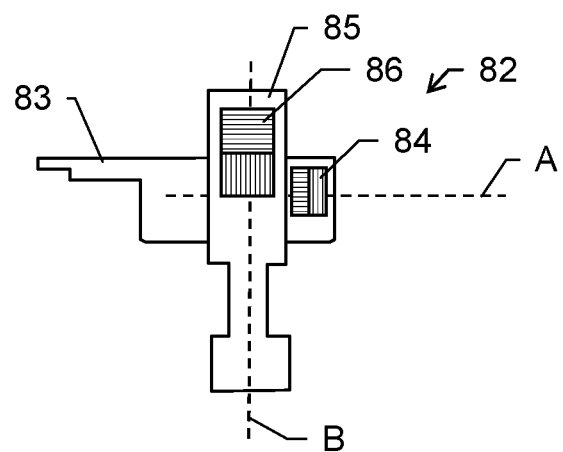
FIG. 5 shows an embodiment of a protection unit according to the invention designed in stand-alone manner.

FIG. 5 shows an embodiment of a protection unit 82 according to the invention designed in stand-alone manner, in particular for being attached to a probe of a CMM in order to protect an optical connection, e.g. a ferrule or an end of an optical fibre, from contamination.

Figure 6:
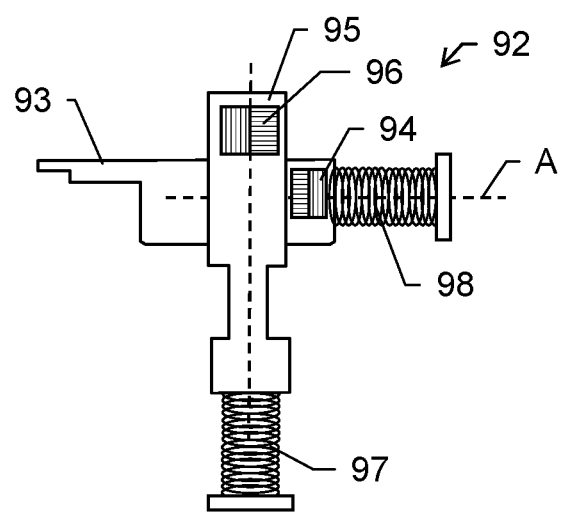
FIG. 6 shows another embodiment of a protection unit according to the invention designed in stand-alone manner.

FIG. 6 shows an embodiment of a protection unit 92 according to the invention designed in stand-alone manner. The actuation components, i.e. the protection element 93 and the switching element 95, are arranged along respective moving axis as already described above. The unit 92 again comprises two magnetic elements 94 and 96 which are arranged and oriented relative to each other so that in an un-mounted state as shown negligible repellent magnetic force is caused between these elements. Repellent magnetic poles are facing each other.

Two springs 97 and 98 are arranged for providing restoring forces to respective components. A first spring 97 holds the switching element 95 in an upper position and a second spring holds the protection element 93 in a blocking-position.

By moving the switching element 95 downwards, e.g. by pressing caused by a part of a probe head, a repulsive magnetic force between the magnetic elements 94,96 is established or increased. The magnetic force is of such magnitude that the second spring 98 is contracted and the protection element 93 moves to the right (relative to the switching element 95). Hence, the protection element 93 is displaced into an open-position.

Although the invention is illustrated above, partly with reference to some specific embodiments, it must be understood that numerous modifications and combinations of different features of the embodiments can be made and that the different features can be combined with each other or with coordinate measuring machines known from prior art.

What is claimed is:

1. A measuring probe adapted to be mounted to a probe head of a coordinate measuring machine for determination of at least one spatial coordinate of a measurement point on an object to be measured, the measuring probe comprising:
an optical measuring unit adapted to provide distance measurements of measuring points at the object;
a probe interface which provides:
modular mounting of the measuring probe to a probe head of the coordinate measuring machine, and
propagation of optical signals to and/or from the probe and the coordinate measuring machine, wherein:
the probe interface is designed as an integrally formed module providing a reproducible mountability of the measuring probe at the probe head and comprising:
a one-sided component of a ball bearing comprising at least three calotte-shaped elevations;
a receptacle:
formed to receive a defined type of probe ferrule with known and precise position and orientation, and
having fixedly arranged the probe ferrule according to the precise position and orientation,
wherein the component of a ball bearing and the receptacle are formed as one piece.

2. The measuring probe according to claim 1, wherein:
the measuring probe comprises a coupling mechanism which provides modular mounting of the measuring probe to the probe head by an elastic element, which—in a mounted state—provides pressing the probe interface in direction of a counter machine interface and thus provides a floating support.

3. The measuring probe according to claim 1, wherein:
the measuring probe comprises a coupling mechanism which provides modular mounting of the measuring probe to the probe head by a magnetic coupling unit adapted to provide an attractive magnetic holding force on demand, wherein the magnetic coupling unit comprises an electro-magnetic element.

4. The measuring probe according to claim 1, wherein:
the measuring probe comprises a dust protection unit, wherein the dust protection unit is arranged and designed so that the probe ferrule—in an un-mounted state of the measuring probe—is protected against getting in contact with dust by a protection element being positioned in a block-position so that a path for propagating optical signals is at least partly blocked, and
propagation of optical signals by means of the probe ferrule to and from the probe head—in a mounted state of the measuring probe—is provided by the protection element being positioned in an open-position so that the path is unblocked.

5. The measuring probe according to claim 1, wherein:
the probe ferrule is fixed inside of the receptacle by means of an adhesive.

6. The measuring probe according to claim 1, wherein the integrally formed module is made of hard metal.

7. A coordinate measuring machine for determination of at least one spatial coordinate of a measurement point on an object to be measured, the coordinate measuring machine comprising:
a machine structure with a plurality of structural components, the structural components comprising at least a base and a probe head for approaching the measurement point, wherein
the machine structure provides linking the probe head to the base, and
the probe head comprises a machine interface which provides modular mounting of a measuring probe to the probe head, wherein:
the machine interface is designed as an integrally formed module providing a reproducible mountability of the measuring probe at the probe head and comprising a one-sided component of a ball bearing comprising at least three calotte-shaped elevations,
a receptacle:
formed to receive a defined type of machine ferrule with known and precise position and orientation, and
having fixedly arranged the machine ferrule according to the precise position and orientation, wherein the component of a ball bearing and the receptacle are formed as one piece.

8. The coordinate measuring machine according to claim 7, wherein the machine ferrule is fixed inside of the receptacle by means of an adhesive.

9. The coordinate measuring machine according to claim 7, wherein the integrally formed module is made of metal.

10. The coordinate measuring machine according to claim 7, wherein the machine interface comprises a magnetic coupling unit adapted to provide a magnetic holding force on demand, wherein the magnetic coupling unit comprises a electro-magnetic element.

11. A system of a coordinate measuring machine according to claim 7, wherein:
the measuring probe is coupled to the probe head by means of their interfaces, wherein the probe interface and the machine interface are designed so and arranged relative to each other so that:
the probe ferrule and the machine ferrule are precisely positioned and oriented relative to each other in non-contact manner, wherein a defined gap is provided between the ferrules, and a precise ball bearing is provided by interaction of the respective one-sided ball bearing components cooperating with each other, wherein the at least three calotte-shaped elevations of one of the one-sided ball bearing components are replaced by at least three recesses.

12. The system according to claim 11, wherein:

the probe ferrule and the machine ferrule are coaxially aligned and the gap is of a width of 200 um at the maximum.

* * * * *